Dec. 13, 1955        A. SOMMER        2,726,852
METHOD AND APPARATUS FOR PREPARING
COATED PARTICLE COMPOSITIONS
Filed Aug. 10, 1953        2 Sheets-Sheet 2

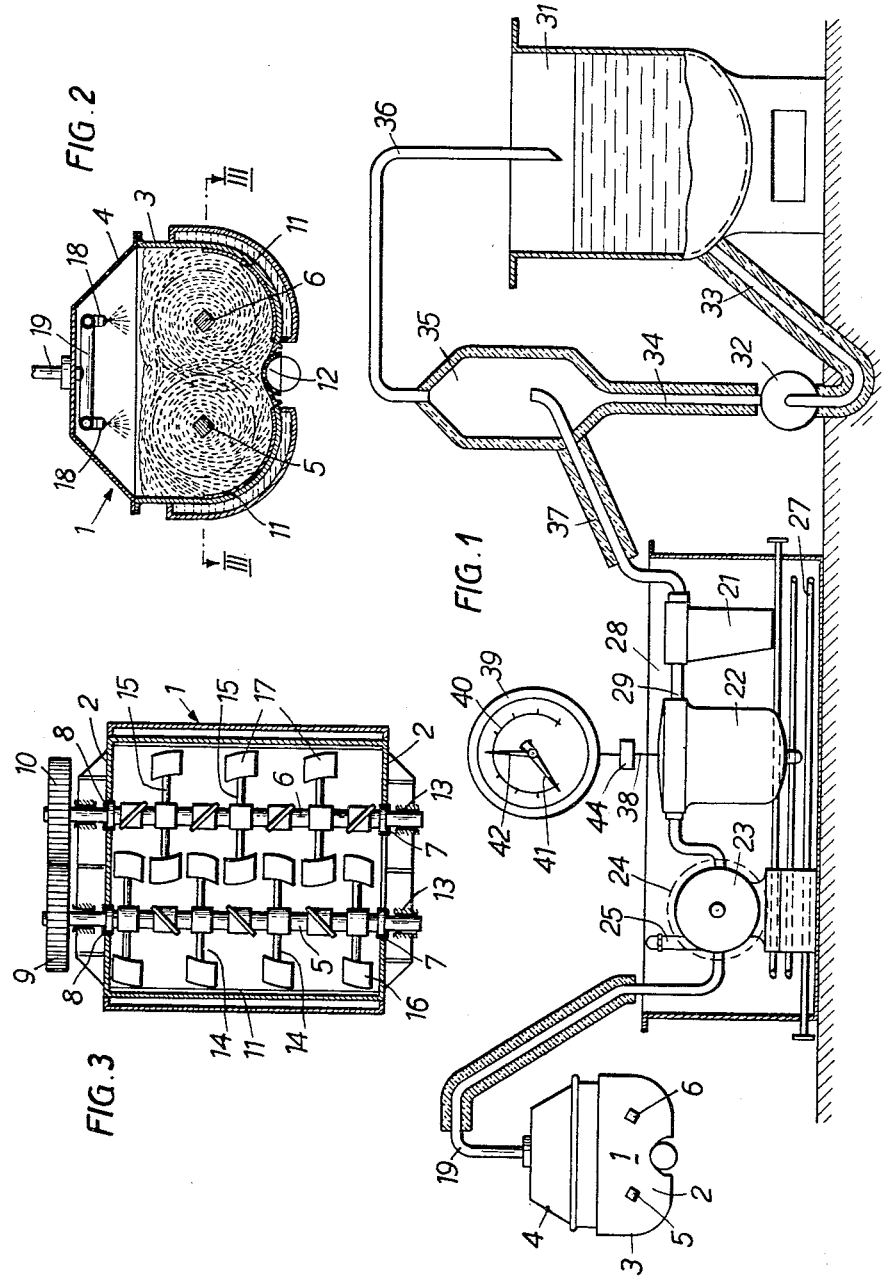

INVENTOR.
BY ALBERT SOMMER

United States Patent Office 2,726,852
Patented Dec. 13, 1955

2,726,852

METHOD AND APPARATUS FOR PREPARING COATED PARTICLE COMPOSITIONS

Albert Sommer, Montagnola, Switzerland, assignor to "Straba" Handels-Aktiengesellschaft, Zurich, Switzerland Application August 10, 1953, Serial No. 373,370

Claims priority, application Germany August 8, 1952

5 Claims. (Cl. 259—154)

The present invention relates to a method for preparing compositions of solid materials in granulous to pulverulent form and of plastic binding material in liquid or liquefied condition, particularly for producing bituminous compositions, by whirling-up the particles of the solid and pressure-atomizing the plastic material as already disclosed in my earlier U. S. Patent No. 2,572,068.

A primary object of the method according to the present invention is to carry out the steps of dosing the plastic mtaerial, feeding it under pressure to atomizing nozzles and mixing without kneading the two components of the composition by atomizing the plastic material onto the whirled-up particles of the solid material in one coordinated and synchronous working operation.

It is a further object of the present invention to provide an apparatus for preparing such compositions of solid granulous and pulverulent, loose particles on the one hand, with liquid or liquefied plastic binder on the other hand, in which apparatus such compositions are obtained by whirling-up the particles of the solid and pressure-atomizing the plastic binder in such a way that the two components adhere to each other by impact. The vortices produced by the whirling-up of the particles of the solid, owing to the high rotating energy inherent to them, retains the minute particles of the solid in suspension for a time sufficiently long, to permit receipt in highest dispersion of the minute liquefied globules of the binder directed in form of an atomized spray into the zone of the medium in vortex movement.

Heretofore such compositions, for example, of loose stone material and of asphalt bitumen, were prepared in apparatus in which the components of the composition were mixed under a kneading pressure, by which the binder was pressed into the free space between the particles of the solid.

In contradistinction thereto the apparatus of the present invention is characterised by a mixing device formed of a container the dimensions of which are such as to give sufficient space to the solid material to permit it to be loosened and to be retained in suspension for a time sufficiently long to receive particles of the plastic in a state of high dispersion directed into the suspension, impeller units disposed in said container for loosening the solid and means for driving said impeller units, a system of nozzles disposed above said zone of whirled-up solids in said container and adapted to atomize the plastic coming from a system comprising a filter, liquidmeter, pump and valves, said instruments and devices being connected in such a way that the liquid binder is automatically dosed and its supply to the nozzles automatically controlled.

Thus in this apparatus the particles of the solid are propelled by appropriate impeller units into a zone of medium in vortex movement, situated above the mixing elements and held in suspension in this zone by the vortices of the zone, while the binder in form of an atomized spray is directed under pressure into this zone.

For further illustration of the invention, reference is now made to the accompanying drawings, in which an embodiment of an apparatus for carrying out the method of this invention is represented by way of example.

Fig. 1 represents schematically an apparatus for preparing bituminous compositions;

Fig. 2 is a vertical section through the mixing device of Fig. 1 shown in an enlarged scale;

Fig. 3 is a horizontal section along the line III—III in Fig. 2, through the mixing device.

Figure 4:
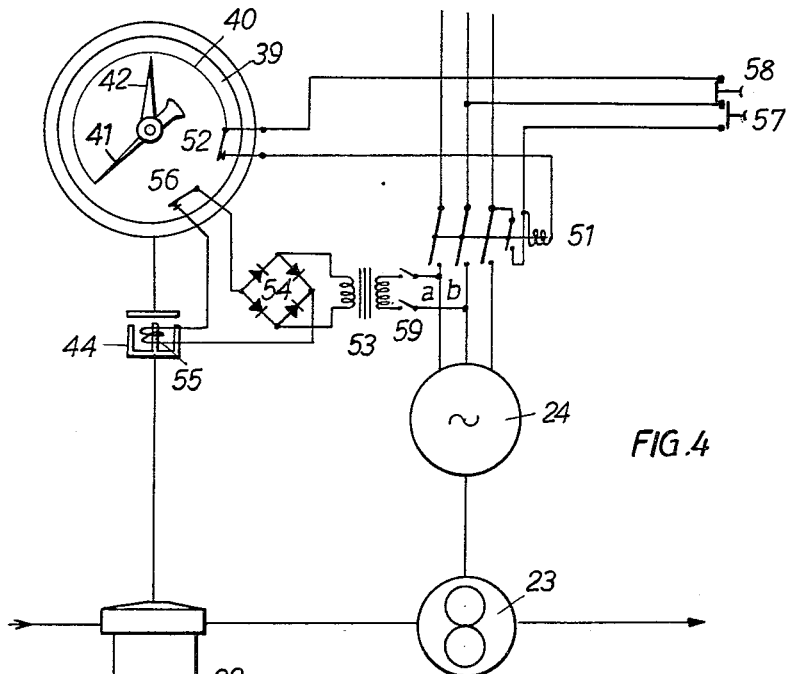
Figs. 4 and 5 are circuit diagrams showing two variants of controls for the feed of the binder to the spray nozzles.

In the drawings the invention is illustrated rather diagrammatically and, in favour of clearness of representation various elements, such as details of the structure, of the drive and control, which are not essential for the explanation and illustration of the invention, are omitted.

The actual mixing device designated by reference numeral 1 is represented in section in Figs. 2 and 3 and also appears at the extreme left in Fig. 1. It is formed of a closed container the content of which is about three times the volume of the solid material to be mixed. It comprises a mixing vessel 3 with side walls 2 and a cover 4. The interior of the vessel 3 is provided in its lower portion with an armour plating 11 for protection of the device against wear and tear. The vessel is emptied over a gutter 12, which in the position shown in Fig. 2 closes the bottom of the vessel 3 but which after an axial rotation of 180° permits the material contained in the mixing device to be discharged. Within the vessel, there is rotatably mounted an impeller system, in this instance two reversely rotating shafts 5 and 6 rotatably mounted in bearings 13 and actuated by a not represented motor driving one of two interengaging spur wheels 9, 10 at a speed of approximately 3 meters per second. Easily exchangeable packings 7 and 8 are provided at the passage of the shafts 5 and 6 through the side-walls 2 of the mixing device. Within the device, arms 14 and 15 are arranged radially around the shafts 5 and 6, respectively, which arms are provided at their ends with blades 16 and 17, respectively. These impeller units are arranged on the two shafts 5 and 6 in such a way that one impeller unit on one shaft alternates with an impeller unit on the other shaft. The shape of the impeller blades is such that their rotation not only produces a vortex zone above the impeller but that simultaneously a transversal movement of the whirled-up particles of the solid is produced so that due to the arrangement of the impeller blades a horizontal circulation of the components and thus of the vortex zone is obtained. By this circulation new surfaces of the particles of the solid are continuously exposed to the globules of the pressure-atomized binder resulting in intensification and simultaneously acceleration of the mixing operation. This effect is obtained by arranging the blades in an angle varying between 30° and 60° with respect to the shaft. The number of blades provided depends on the content of the vessel and may vary between 8 and 30 for each shaft.

The nozzle system provided for atomizing the binder includes nozzles 18 arranged in two parallel rows in the space surrounded by the cover 4 of the mixing device 1. The nozzles 18 are directed towards the zone in vortex movement and adapted to atomize the plastic binder and to direct it in form of a spray towards the particles of the solid in suspension in said zone. The nozzles 18 receive the liquid plastic material through a duct 19 connected to a system forming a unit per se comprising in a container a filter, a liquidmeter and a pump. The elements of this system are connected to each other in such a way that they automatically dose the feed of the binder to the nozzles and automatically stop this feed after a predetermined volume of binder has been atomized. This system is schematically represented in Fig. 1. It comprises in a container 28 a filter 21, a liquidmeter 22, a pump 23 driven by an electric motor 24 a control valve 25 and heating conduits 27. The plastic material is fed to the nozzles 18 in pre-dosed amounts the volume of which depends on the volume of solid material to be mixed therewith. The plastic binding material is first heated and liquefied in a furnace 31. A pump 32 delivers the liquid binder through insulated conduits 33 and 34 into an insulated container 35. An overflow pipe 36 returns excess binder to the furnace.

From the container 35 the liquid binder flows through an insulated conduit 37 into the filter 21 disposed in the container 28. In order to keep at equal temperature all instruments and devices located in this container 28 the latter is filled with a heat conducting special oil heated by a hot fluid flowing through the heating conduits 27. Thus the binder remains at a constant temperature and viscosity during its passage through the apparatus and instruments of the container 28, which is very important for a regular atomizing of the binder.

From the filter 21 the binder flows through a connection pipe 29 into the liquidmeter 22 connected over a transmission 38 with an optical indicator 39 having a scale 40, a measuring hand 41 and a setting hand 42. The setting hand 42 serves to set the volume of binder destined to be fed to the nozzles and necessitated in the mixing device. The electrical contact circuit of the setting hand 42 is such that the further feed of binder to the nozzles 18 is cut off by the hand 42 over a magnet clutch 44 as soon as the two hands 41 and 42 coincide. Immediately afterwards the measuring hand 41 returns into its starting position shown in Fig. 1.

Fig. 4 represents a circuit diagram for the electrical control of the feed of binder to the nozzles by means of an intermittently operating pump motor.

This motor, which in Fig. 4 as in Fig. 1 is designated by reference numeral 24 drives the pump 23. Reference 22 designates the liquidmeter connected over the transmission 38 and over an electromagnetically controlled clutch 44 with the indicator 39. The motor 24 is connected into the main circuit over a thermally controlled excess current remote control switch 51.

The indicator 39 is connected by contacts 52 into the motor circuit in such a way that the latter is interrupted, i. e. the motor stopped, as soon as the two hands 41 and 42 coincide. A transformer 53 is connected to the phases (a) and (b) in the supply line to the pump motor 24, which transformer over a rectifier 54 feeds the electromagnet 55 of the clutch 44. An opening contact 56 is connected into this circuit for protection of the indicator. This contact 56 is actuated by the measuring hand 41, if after the latter has passed the contact 52 the circuit of the motor is not interrupted.

The volume which shall be fed to the nozzles is set with the setting hand 42 of the indicator 39. By actuation of a push-button 57 the circuit is closed and the motor is started. Simultaneously the magnet 55 of the clutch 44 is excited over transformer 53 and rectifier 54 so that the mechanical connection between the liquidmeter and the indicator is established and plastic material is fed to the nozzles 18 until the predetermined volume set by adjustment of the setting hand 42 has passed through the liquidmeter.

As soon as the measuring hand 41 coincides with the setting hand 42 the contact 52 is opened and the motor stands still. Simultaneously the electrically excited clutch 44 becomes currentless, the mechanical connection to the measuring hand 41 is interrupted and the hand 41 returns into its starting or zero position under the action of a not represented spring.

If one of these electrical elements fails to operate correctly, the current may continue to arrive to the motor even after the measuring hand has reached the position in which it coincides with the setting hand. For this case the contact 56 has been provided, which interrupts the circuit of the magnet 55 as soon as the measuring hand has passed the contact 52. Thereby any damage which could be caused to the indicator by a forced further advance of the measuring hand is prevented.

The described operation must be repeated for each new charge of binder to be fed to the nozzles, by actuating again the push-button switch 57. A sudden interruption during a working operation may be obtained at any time by actuating a push-button 58. A two-phase switch 59 connected into the supply line permits operation of the pump without switching-in the indicator system.

Figure 5:
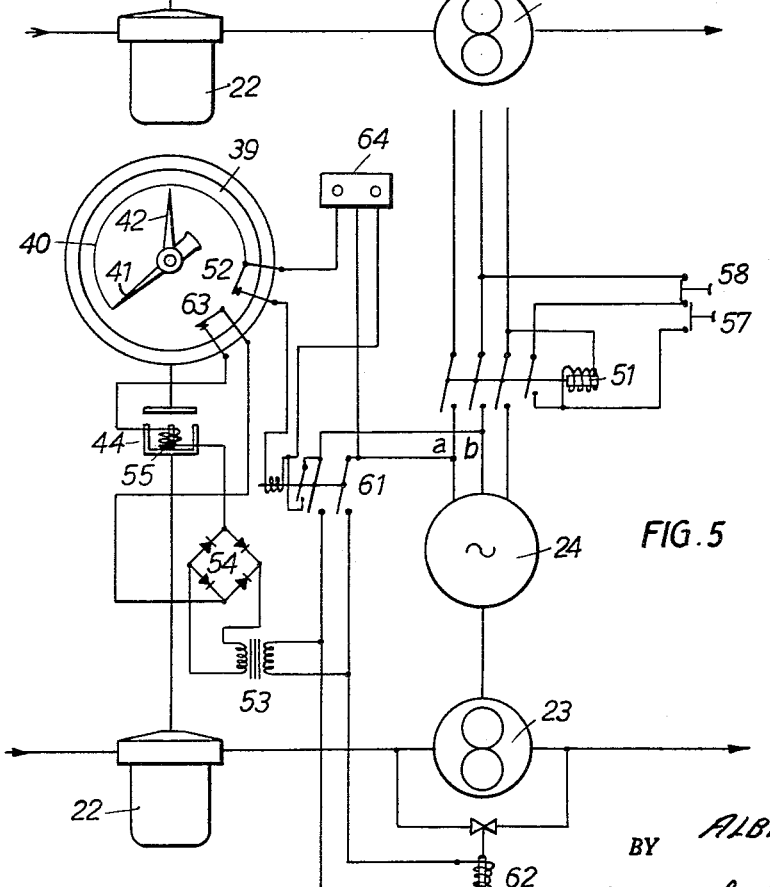

The circuit diagram of another control is represented in Fig. 5. This variant differs from the one of Fig. 4 only insofar as it is destined to a system with a continuously running pump motor. As in the system of Fig. 4 the motor 24 actuates the pump 23. The liquidmeter 22 is connected to the indicator 39 over a magnet clutch 44. The pump motor is connected to the main circuit over a thermally controlled excess current remote control switch 51. The motor 24 is started and stopped by pushbuttons 57, 58 respectively. The two-phase switch 61 is connected to the phases a and b branched from the three-phase main circuit behind the three-phase switch 51. Closing of the circuit by switch 61 operates an electrically controlled valve 62 and excites over transformer 53 and rectifier 54 the magnet 55 of the clutch 44. An opening contact 52 is further connected into the circuit of switch 61, which contact 52 is actuated by the measuring hand 41 of the indicator 39. This contact 52 interrupts the circuit as soon as the measuring hand 41 coincides with the setting hand 42.

A safety opening contact 63 is connected in series into the circuit of the electromagnet 55 of the clutch 44. This contact interrupts the circuit when the measuring hand 41 has passed over the contact 52. It serves to protect from damage the indicator as mentioned with respect to the contact 56 of Fig. 4.

The system according to Fig. 5 operates as follows:

The motor 24 is started by actuation of the push-button 57. As the electrically controlled valve 62 is open, the piping of the pump is not under pressure and the liquid binder circulates freely. As soon as the desired volume of binder to be fed to the nozzles has been set by means of the setting hand 42 of the indicator the exciting current circuit to the valve 62 is closed by actuation of push-button 64. The valve 62 being closed the pump starts to feed binder from the liquidmeter under pressure to the nozzles. The volume of liquid having passed through the liquidmeter is continuously measured and indicated by the measuring hand 41. As soon as the latter coincides with the setting hand 42 the contact 52 is opened and the circuit interrupted. By the interruption of their exciting current the valve 62 and the clutch 44 are actuated, resulting in a diminution of the pressure and the feed of binder to the nozzles 18 ceases. As soon as the measuring hand 41 has been released by the clutch 44 it returns into its starting or zero position under the action of a not represented spring. The safety contact 63 connected with the clutch 44 is actuated only if the contact 52 fails to disconnect the switch 61. The motor 24 is continuously running and the operator starts each operation by actuating the push-button 61. The atomizing of the binder is automatically interrupted after the predetermined volume of binder has passed through the liquidmeter and has been atomized by the nozzles 18.

From the foregoing it may be seen that with the described apparatus it is possible to mix solid materials in granulous to pulverulent form with a predetermined amount of liquid or liquefied, plastic or viscous binding material, whereby three distinct working operations, namely, the dosage of the binder, the feeding of the latter under pressure into the spray nozzles and the mixing of the components by atomizing the plastic material onto the whirled-up particles of the solid, are carried out in one coordinated and synchronous working operation. The feeding of binder to the nozzles is automatically interrupted as soon as the predetermined amount of it has been atomized and the mixing is terminated. The obtained composition does not need any subsequent kneading as is necessary in the heretofore known apparatus. When the feed of the binder has been interrrupted, as can be determined, by observing indicator 39, the container 31 can be emptied by rotating the gutter trough 12 through 180°. The rotation of the gutter 12 also stops the whirling up of the composition.

It is of course possible to make use of other means for controlling the feed of the binder to the nozzles without departing from the scope of the present invention. For example the pump motor could be connected with the pump over an electromagnetically controlled clutch, so that it would be possible to keep the motor running continuously and to switch-in and out the pump only.

With the described apparatus it is possible to produce compositions in which the particles of the solid cover the particles of the plastic. In this case the mixture represents a dispersive system in which the entire mass retains the pulverulent condition of the solid, and the apparent physical characteristics of the mass are those of its external phase, namely the solid. In this stage therefore, the cohesiveness of the particles is suspended. The plastic is in an "inactive" condition. This kind of mixture is obtained when the apparatus works at a temperature which is below the temperature of liquefying of the binder (asphalt) so that the globule form of the atomized plastic remains.

If the mixing device works at a temperature which is higher than the melting point of the plastic the atomized particles of the plastic are liquefied and the "active" condition of the plastic is obtained in which the plastic covers the particles of the solid.

I claim:

1. In a method for preparing composition in which granulous and pulverulent solid materials are at least partially coated with a plastic binding material wherein the particles of the solid material are whirled up and are sprayed with the plastic binding material in liquid form while suspended in air, the steps comprising spraying the solid material with said liquid plastic binding material while the said solid material is suspended in air, metering the amount of plastic material sprayed onto said solid material, simultaneously ceasing the spraying operation and the whirling operation when a predetermined proportion of plastic material has been sprayed onto the particles and discharging the mixed composition from the mixing device.

2. In an apparatus for preparing compositions of solid material in granulous and pulverulent form coated with a plastic binding material of the type wherein the solid granulous and pulverulent particles are whirled into the air by impellor units in a closed container and coated with the atomized plastic binding material while suspended in a column of air, said plastic binding material being dispersed from a system of nozzles located above impellor units for whirling the said particles into the air, the improved construction comprising pump means for dispersing the plastic binding material through said nozzles, a filter and a liquid meter connected at the entrance side of said pump, indicating and control means associated with said liquid meter, said control means including an adjustable, electric switch device for automatically stopping the feed of the plastic binding material to said closed container when a predetermined amount, depending on the adjustment of said switch device, of the plastic binding material has been introduced into said closed container.

3. The device as set forth in claim 2 in which the pump for supplying plastic bonding material to said closed container is independent of said electric switch control means and the said electric switch control means includes a valve system for interrupting the supply of plastic binding medium to said nozzles.

4. The device as set forth in claim 2 comprising means for enclosing said pump, said filter and said liquid meter means inside said enclosing means for maintaining the temperature of the plastic binding material being fed through said pump, said filter and said liquid meter at a uniform and constant value.

5. The device as set forth in claim 2 in which said closed container contains two parallel series of impellor units, the units of each series being mounted on parallel shafts which rotate in opposite directions, said container comprising a longitudinal slit in the lower wall thereof parallel to and substantially equally spaced from each of said parallel shafts, an inverted channel member normally closing said slit, said channel member being rotatable to open said slit and discharge the coated products from the container.

References Cited in the file of this patent

UNITED STATES PATENTS

| | | |
|---|---|---|
| 616,373 | Upton | Dec. 20, 1898 |
| 765,975 | Hooley | July 26, 1904 |
| 1,600,948 | Poore | Sept. 21, 1926 |
| 2,073,779 | Bramsen | Mar. 16, 1937 |
| 2,237,787 | Marshall | Apr. 8, 1941 |
| 2,572,068 | Sommer | Oct. 23, 1951 |
| 2,631,728 | Popp | Mar. 17, 1953 |